United States Patent
Watanabe et al.

(10) Patent No.: US 10,198,177 B2
(45) Date of Patent: Feb. 5, 2019

(54) IMAGE PROCESSING APPARATUS, IMAGE PROCESSING METHOD, AND RECORDING MEDIUM

(71) Applicants: Ayako Watanabe, Kanagawa (JP); Shuhei Tsubone, Tokyo (JP); Tatsuyuki Oikawa, Tokyo (JP); Yuichi Kawasaki, Kanagawa (JP)

(72) Inventors: Ayako Watanabe, Kanagawa (JP); Shuhei Tsubone, Tokyo (JP); Tatsuyuki Oikawa, Tokyo (JP); Yuichi Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/646,649

(22) Filed: Jul. 11, 2017

(65) Prior Publication Data
US 2018/0018085 A1    Jan. 18, 2018

(30) Foreign Application Priority Data

Jul. 14, 2016  (JP) ................. 2016-139234
Aug. 4, 2016   (JP) ................. 2016-153643

(51) Int. Cl.
*G06F 3/0488*   (2013.01)
*G06F 3/0484*   (2013.01)
*G06F 3/042*    (2006.01)

(52) U.S. Cl.
CPC ........ *G06F 3/04883* (2013.01); *G06F 3/0488* (2013.01); *G06F 3/04845* (2013.01); *G06F 3/0421* (2013.01); *G06F 2203/04808* (2013.01)

(58) Field of Classification Search
None
See application file for complete search history.

(56) References Cited

U.S. PATENT DOCUMENTS 6,326,954 B1 * 12/2001  Van Ieperen ....... G06F 3/04883
                                                    178/18.01
2007/0176904 A1 *  8/2007  Russo .................. G06F 3/0414
                                                    345/173

(Continued)

FOREIGN PATENT DOCUMENTS

JP    2010-224635    10/2010
JP    2015-084211     4/2015

(Continued)

*Primary Examiner* — Jennifer Mehmood
*Assistant Examiner* — Parul H Gupta
(74) *Attorney, Agent, or Firm* — Oblon, McClelland, Maier & Neustadt, L.L.P.

(57) ABSTRACT

An image processing apparatus, an image processing method, and a recording medium storing a program for causing a computer to execute the image processing method. The image processing apparatus and the image processing method includes obtaining size data of a contact portion of an object on a display, the object including a first object and a second object, measuring a time passed since a touch of the first object is detected by a detector, and performing at least one of controlling display of an image to be displayed at the contact portion or erased from the contact portion based on the size data obtained by the obtaining and based on whether the second object is detected before a prescribed time has elapsed since the measuring started, and controlling display of an image to be changed based on an operation made by the first object and the second object.

12 Claims, 15 Drawing Sheets

(56) References Cited

U.S. PATENT DOCUMENTS

| | | | |
|---|---|---|---|
| 2011/0169756 A1* | 7/2011 | Ogawa | G06F 3/03545 345/173 |
| 2015/0077369 A1 | 3/2015 | Nagahara et al. | |
| 2015/0212713 A1 | 7/2015 | Takehara | |
| 2017/0109121 A1 | 4/2017 | Tsubone | |

FOREIGN PATENT DOCUMENTS

| | | |
|---|---|---|
| JP | 2015-158900 | 9/2015 |
| JP | 2017-076207 | 4/2017 |

* cited by examiner

FIG. 14

| STROKE DATA ID | START TIME | END TIME | COLOR | WIDTH | st001 COORDINATE ARRANGEMENT DATA ID | st002 COORDINATE ARRANGEMENT DATA ID | st003 COORDINATE ARRANGEMENT DATA ID |
|---|---|---|---|---|---|---|---|
| s001 | 20150522152202 | 20150522152205 | ff0000 | 2 | c001 | ... | ... |
| s002 | 20150522152612 | 20150522152615 | 000ff0 | 3 | c002 | ... | ... |
| s003 | 20150522152704 | 20150522152712 | ff0000 | 1 | c003 | ... | ... |
| ... | ... | ... | ... | ... | ... | ... | ... |

FIG. 15

| X COORDINATE VALUE | Y COORDINATE VALUE | DIFFERENCE IN TIME | c001 WRITING PRESSURE | c002 WRITING PRESSURE | c003 WRITING PRESSURE |
|---|---|---|---|---|---|
| 10 | 10 | 100 | 255 | ... | ... |
| 12 | 10 | 200 | 255 | ... | ... |
| 14 | 12 | 300 | 255 | ... | ... |
| ... | ... | ... | ... | ... | ... |

IMAGE PROCESSING APPARATUS, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2016-139234 and 2016-153643, filed on Jul. 14, 2016, and Aug. 4, 2016, respectively, in the Japan Patent Office, the entire disclosures of which is are hereby incorporated by reference herein.

BACKGROUND

Technical Field

Embodiments of the present disclosure relate to an image processing apparatus, an image processing method, and a recording medium storing a program for causing a computer to execute the image processing method.

Background Art

For example, in corporations, educational institutions, and government institutions etc., an electronic information board system including, for example, electronic whiteboards are used, which display stroke images such as text, figures, and symbols. Such an electronic information board system is provided with a display device for which a touch panel is provided, and a computer that controls the display device. The touch panel detects the strokes that are drawn by users on the display device. The computer may control the stroke images that are formed by the strokes, or erase a part of the stroke images that are displayed in the track of the strokes.

A display device is known including a touch panel, an acquisition unit that acquires the data of a contacting area through the touch panel, a first determining unit that determines whether the shape of the contacting area satisfies predetermined conditions, and a display controller that displays an image through the touch panel at a position corresponding to the first contacting area that does not satisfy the predetermined conditions and erases the image in the second contacting area that satisfies the predetermined conditions.

SUMMARY

Embodiments of the present disclosure described herein provide an image processing apparatus, an image processing method, and a recording medium storing a program for causing a computer to execute the image processing method. The image processing apparatus and the image processing method includes obtaining size data of a contact portion of an object on a display, the object including a first object and a second object, measuring a time passed since a touch of the first object is detected by a detector, and performing at least one of controlling display of an image to be displayed at the contact portion or erased from the contact portion based on the size data obtained by the obtaining and based on whether the second object is detected before a prescribed time has elapsed since the measuring started, and controlling display of an image to be changed based on an operation made by the first object and the second object.

BRIEF DESCRIPTION OF THE DRAWINGS

A complete appreciation of exemplary embodiments and the many attendant advantages thereof will be readily obtained as the same becomes better understood by reference to the following detailed description when considered in connection with the accompanying drawings.

FIG. 14 is a diagram illustrating stroke arrangement data according to an embodiment of the present disclosure.

FIG. 15 is a diagram illustrating an example data structure of the coordinate arrangement data, according to an embodiment of the present disclosure.

Figure 1:
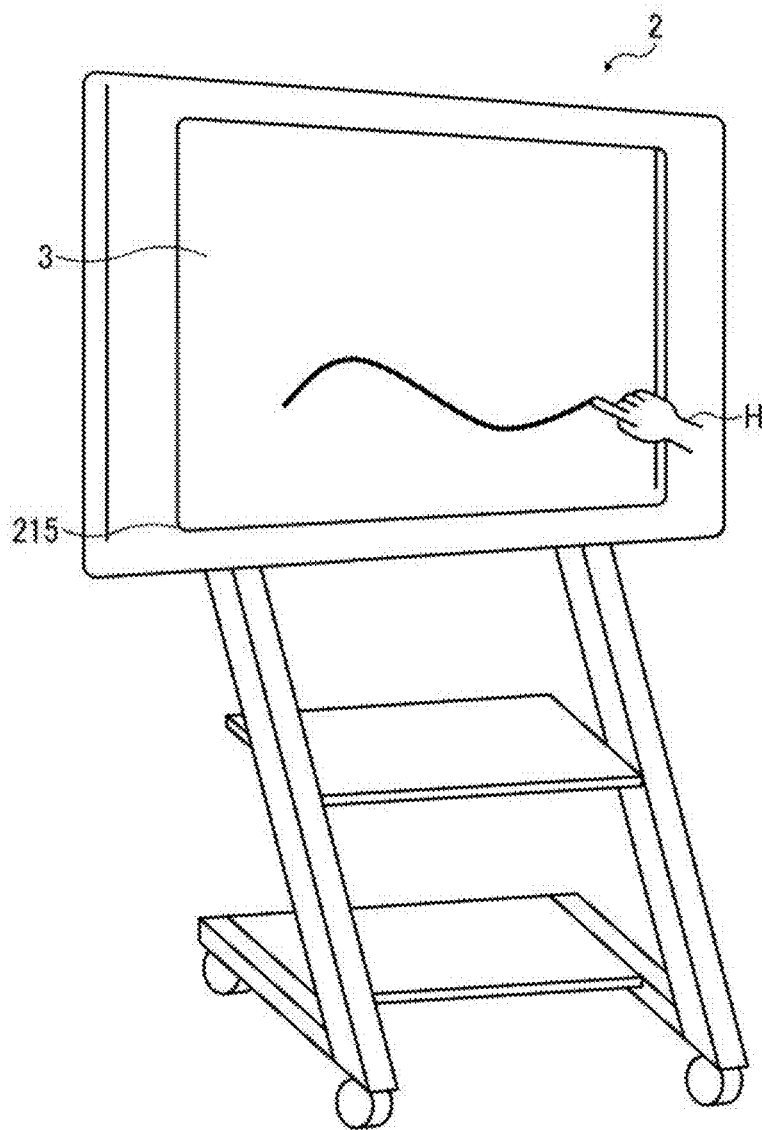
FIG. 1 is an external view of an electronic whiteboard according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, an embodiment of the present invention is described with reference to the drawings.

<<Schematic Configuration of Electronic Whiteboard>>

Firstly, a schematic configuration of an electronic whiteboard 2, which is an example of an electronic information board system, according to an embodiment of the present disclosure is described with reference to FIG. 1.

FIG. 1 is an external view of the electronic whiteboard 2 according to the present embodiment.

As illustrated in FIG. 1, the electronic whiteboard 2 includes, for example, a contact sensor 215 that detects a touch of an object to be detected such as a hand H, a display 3 that outputs an image or the like that is drawn by the hand H, and a central processing unit (CPU) 201, as will be described later, that performs the processes related to the image displayed on the display 3, based on the result of detection made by the contact sensor 215.

The electronic information board system is not limited to an electronic whiteboard, but may be, for example, a personal computer (PC), a tablet PC, a smartphone, digital signage, a telestrator, or a game machine. Moreover, the electronic information board system may be provided with a communication device, and may share the images drawn on the touch panel with other communication terminals as contents of data.

<<Hardware Configuration of Electronic Whiteboard>>

The hardware configuration of the electronic whiteboard 2 according to the present embodiment will be described with reference to FIG. 2.

Figure 2:
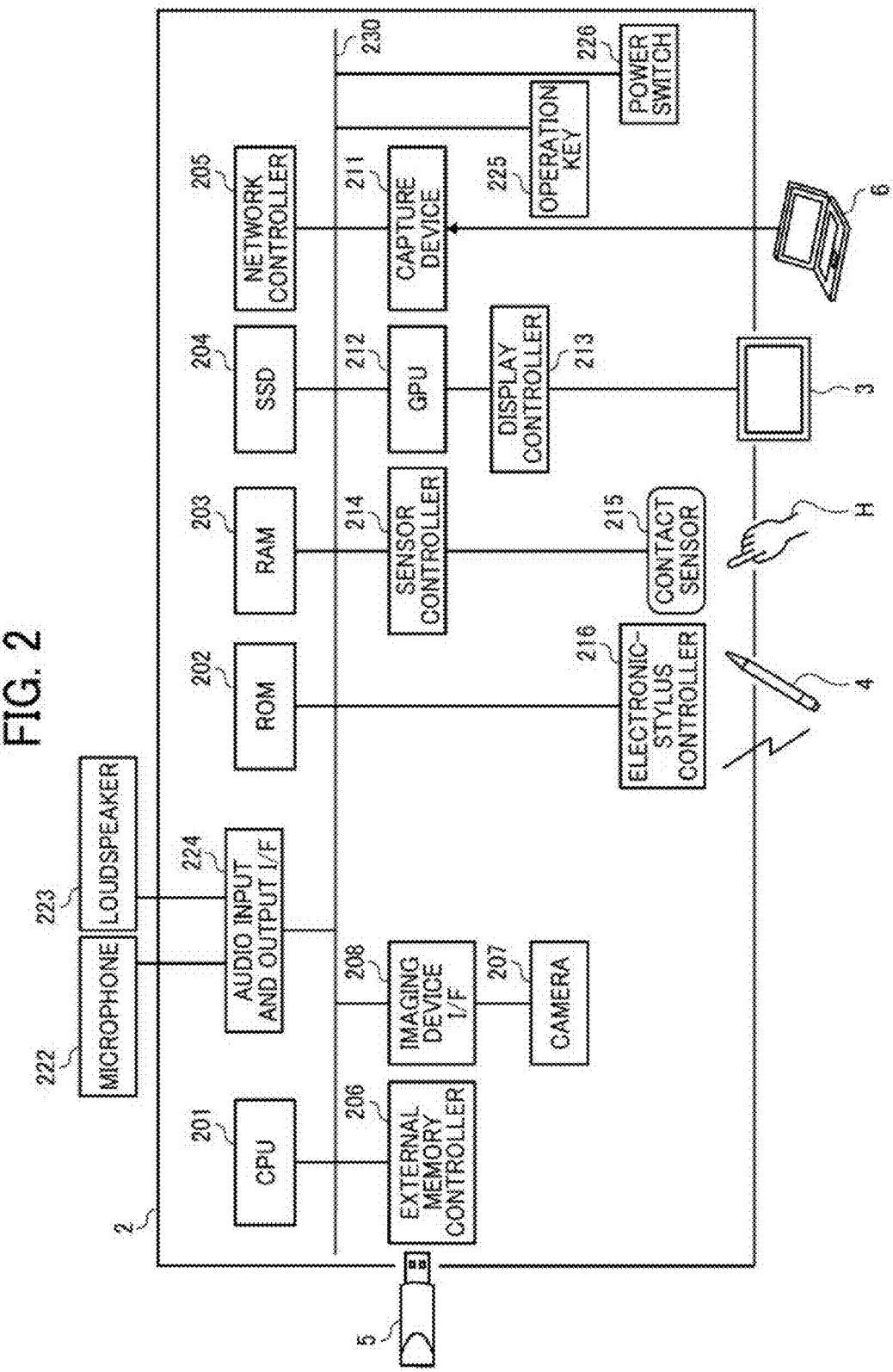
FIG. 2 is a schematic block diagram illustrating a hardware configuration of an electronic whiteboard according to an embodiment of the present disclosure.

FIG. 2 is a schematic block diagram illustrating a hardware configuration of the electronic whiteboard 2 according to the present embodiment.

As illustrated in FIG. 2, the electronic whiteboard 2 includes, for example, a central processing unit (CPU) 201 that controls the overall operation of the electronic whiteboard 2, a read only memory (ROM) 202 that stores a control program used for controlling the CPU 201 such as an initial program loader (IPL), a random access memory (RAM) 203 that is used as a work area for the CPU 201, a solid state disk (SSD) 204 that stores various data such as a control program for the electronic whiteboard 2, a network controller 205 that controls the communication with an external device through a communication network, and an external memory controller 206 that controls the communication with an external device such as a universal serial bus (USB) memory 5. Further, the electronic whiteboard 2 includes, for example, a camera 207 that captures a target object under the control of the CPU 201, an imaging device interface (I/F) 208 that controls the operation of the camera 207, a capture device 211 that controls the display of a laptop personal computer (PC) 6 to display the video data as a still image or moving images, a graphics processing unit (GPU) 212 specializing in processing graphics, and a display controller 213 that controls the visual display to output the image generated by the GPU 212 to the display 3. Further, the electronic whiteboard 2 includes, for example, a sensor controller 214 that controls operation of the contact sensor 215, and a contact sensor 215 that detects a touch onto the display 3, which is made by, for example, an electronic stylus 4 and a user's hand H. In the present embodiment, the contact sensor 215 senses a touch input to specific coordinates on the display 3 using the infrared blocking system. In a method where coordinates are input and detected, the two light receivers and light emitters that are disposed at both ends on the upper side of the display 3 emit a plurality of infrared light rays in parallel with the display 3, and the emitted infrared light rays are reflected by a reflector disposed at the periphery of the display 3. Then, the two light receivers and light emitters receive the light rays that return in the same optical paths as the optical paths in which the two light receivers and light emitters have emitted the light rays. The contact sensor 215 outputs to the sensor controller 214 the identification (ID) of the infrared light rays that are emitted from the two light receivers and light emitters and then are blocked by an object such as the hand H, and the sensor controller 214 specifies the coordinates of the position touched by the object. Note also that all sorts of ID as described below are an example of identification information.

In the present embodiment, the contact sensor 215 uses the infrared blocking system for detection. However, no limitation is intended thereby. The contact sensor 215 may use, for example, a capacitive method where changes in capacitance are detected to specify a touched position, a resistive method where changes in voltage between two facing resistive membranes are sensed to specify the touched position, and an electromagnetic induction system where electromagnetic induction caused when the object touches the display is detected to specify the touched position. Alternatively, the contact sensor 215 may identify the coordinates of the contact position using the camera 207.

Moreover the electronic whiteboard 2 is provided with an electronic stylus controller 216. The electronic stylus controller 216 communicates with the electronic stylus 4 to detect a touch on the display 3 by the tip or bottom of the electronic stylus 4. In addition or in alternative to detecting a touch by the tip or bottom of the electronic stylus 4, the electronic stylus controller 216 may also detect a touch by another part of the electronic stylus 4, such as a part held by a hand.

Further, the electronic whiteboard 2 includes, for example, an audio input and output interface (I/F) 224 that controls the input and output of an audio signal between an external microphone 222 and an external loudspeaker 223 under the control of the CPU 101, an operation key 225 that accepts user's operation, and a power switch 226 that turns on or turns off the power of the electronic whiteboard 2. Note also that any of the microphone 222 and the loudspeaker 223 may be built into the electronic whiteboard 2.

Further, the electronic whiteboard 2 includes a bus line 230, such as an address bus or a data bus, which electrically connects the elements with each other as illustrated in FIG. 2. The control program for the electronic whiteboard 2 may be stored on a computer-readable recording medium such as a CD-ROM for distribution, or stored on a server on any desired network to be downloaded.

<<Functional Configuration of Embodiment>>

Figure 3:
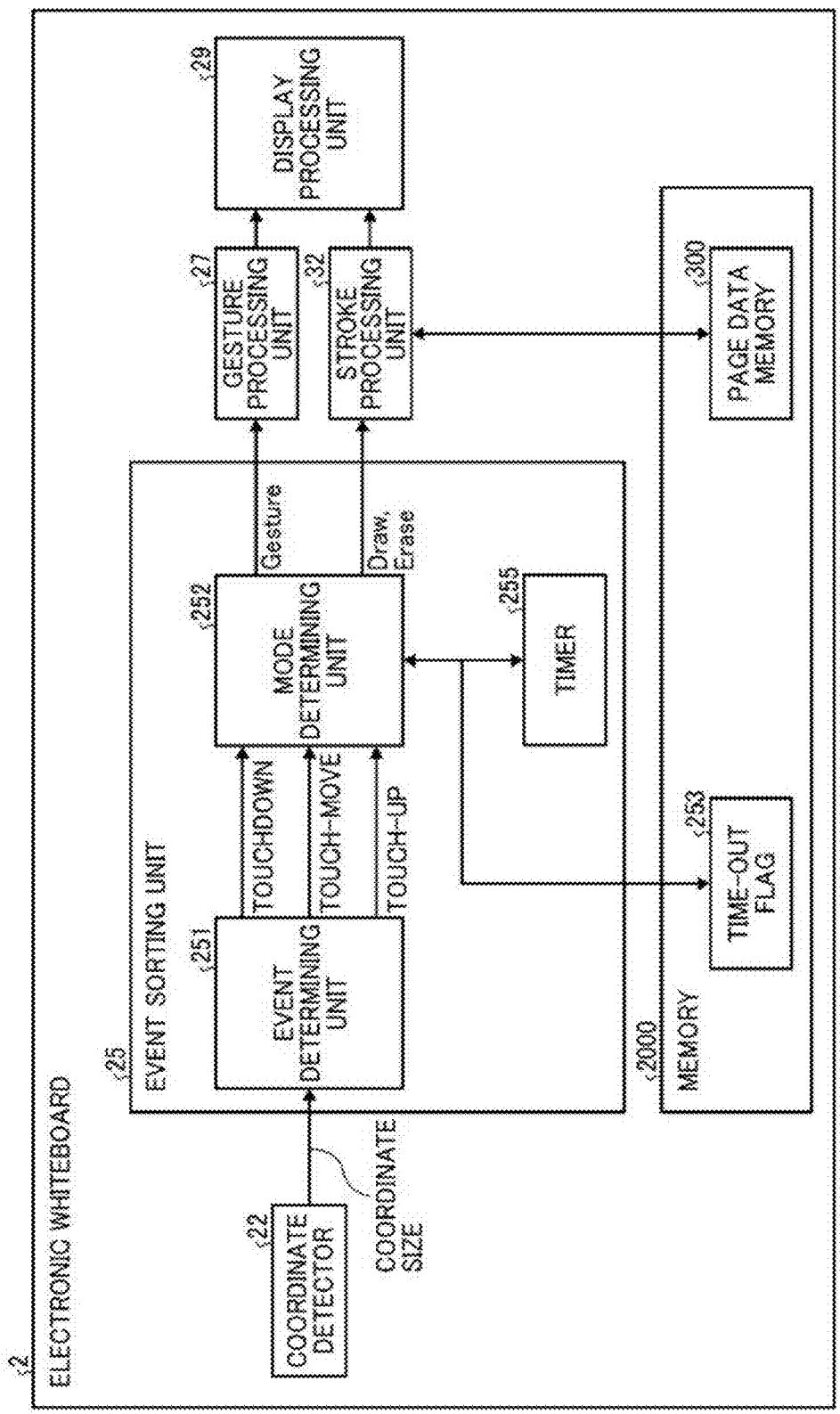
FIG. 3 is a functional block diagram of an electronic whiteboard according to an embodiment of the present disclosure.

FIG. 3 is a functional block diagram of the electronic whiteboard 2 according to the present embodiment.

The electronic whiteboard 2 is provided with the hardware components as illustrated in FIG. 2 which operate in cooperation with the control programs, thereby implementing the functional configuration as illustrated in FIG. 3. Moreover, the electronic whiteboard 2 includes a memory 2000 implemented by the SSD 204.

A coordinate detector 22 is substantially implemented by the contact sensor 215, and detects a touch on the display 3 by an object to be detected such as the hand H and outputs the coordinates of the contact portions HT1 and HT2, the sizes of the contact portions HT1 and HT2.

Figure 4:
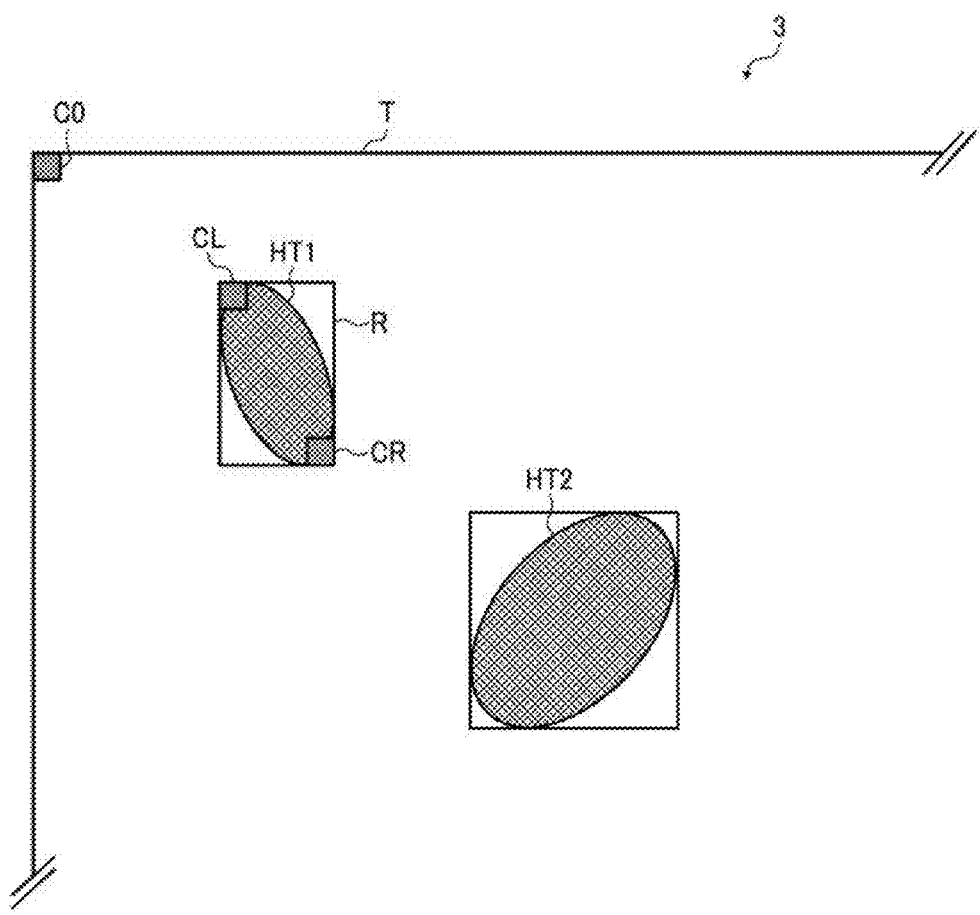
FIG. 4 is a diagram illustrating the screen of a display device, according to an embodiment of the present disclosure.

FIG. 4 is a diagram illustrating the screen of the display 3, according to the present embodiment.

In the present embodiment, the coordinates on the screen of the display 3 correspond to the pixels. For example, the coordinates C0 at the top-left corner of the screen is (0, 0), and the coordinates at the bottom-right corner of the screen is (1920, 1080). The size of the contact portion HT1 is the difference (for example, (4, 6)) between the coordinates CR (for example, (11, 11)) at the bottom-right corner of the rectangle R that is formed by the tangent lines of the contact portion HT1 and the coordinates CL (for example, (7, 5)) at the top-left corner of the rectangle R.

An event sorting unit 25 may be implemented by the instructions from the CPU 201, and sorts events in which the user's hand H touches the display 3 into detailed categories of events upon setting the operation mode.

An event determining unit 251 of the event sorting unit 25 obtains an output from the coordinate detector 22 to detect the following events.

Touchdown Event: an event in which an object to be detected such as the hand H is put down (and detected by the contact sensor 215)

Touch-move Event: an event in which the coordinates of the object detected in the touchdown event move. When the coordinates move in the touch-move event, the coordinates that are detected at time $t_n$ and the coordinates that are detected at time $t_{n+1}$ are within a predetermined area. Note that the predetermined area indicates predetermined distance where an object to be detected such as the hand H could move between the time $t_n$ and the time $t_{n+1}$.

Touch-up Event: an event in which the object detected in the touchdown event or the touch-move event is put up (and no longer detectable by the contact sensor 215). The event determining unit 251 gives one identification number to the object to be detected between the instant when the object to be detected is put down and the instant when the object to be detected is put up. Note that such an identification number will be referred to simply as identification (ID) in the following description.

A mode determining unit 252 of the event sorting unit 25 determines the operation mode based on the event detected by the event determining unit 251.

A timer 255 of the event sorting unit 25 is a time measuring instrument that measures a fixed time period. Timer 255 may measure the time using a program, or may use hardware such as an integrated circuit (IC) to measure the time. The fixed time period is set in view of the time interval between the instant when the first finger touches and the instant when the second finger touches when two fingers touch the display 3 for gesture operation, and is for example, a few tens of millisecond to several hundreds of millisecond. Note that the time period that is set to the timer 255 in not necessarily fixed. Alternatively, when gesture operation is input, the event determining unit 251 may learn the time interval between the instant when the first finger touches and the instant when the second finger touches, and may set the learned time interval to the timer 255.

When the timer 255 times-out, a time-out flag 253 sets "True" to the memory 2000. The initial value of the time-out flag 253 is set to "False" when the electronic whiteboard 2 is started.

A gesture processing unit 27 may be implemented by the instructions from the CPU 201, and executes the processes corresponding to the gesture operation in response to an event that has been sorted into the operation mode "Gesture" by the event sorting unit 25. A display processing unit 29 may be implemented by the instructions from the CPU 201, and controls the display 3 to display an image.

A stroke processing unit 32 may be implemented by the instructions from the CPU 201, and executes the processes corresponding to the operation mode in response to an event that has been sorted into the operation modes "EraseLarge", "EraseSmall", and "Draw" by the event sorting unit 25. The results of the processes corresponding to the operation mode are stored in the page data memory 300 as operation data.

The page data memory 300 is a memory area of the memory 2000, and stores page data as depicted in Table 1 given below. Table 1 is a diagram illustrating an example data structure of the page data. The page data includes one-page data to be displayed on the display 3, which includes stroke arrangement data (items of stroke data for one character, etc.) and media data.

TABLE 1

| PAGE DATA ID | START TIME | END TIME | STROKE ARRANGEMENT DATA ID | MEDIA DATA ID |
|---|---|---|---|---|
| p001 | 20150522152034 | 20150522152402 | st001 | m001 |
| p002 | 20150522152415 | 20150522152825 | st002 | m002 |
| p003 | 20150522153345 | 20150522154033 | st003 | m003 |
| ... | ... | ... | ... | ... |

In the page data, page data ID by which any desired one page is identified, the start time at which the display of that page is started, the end time when rewriting of page is no longer performed, for example, by stroke and gesture, stroke arrangement data ID that identifies the stroke arrangement data caused by the stroke of the electronic stylus 4 or the user's hand H, and media data ID that identifies the media data are stored in association with each other. The stroke arrangement data is used to display a set of stroke images on the display 3. The media data is used to display another image overlapping with the stroke image on the display 3.

The stroke arrangement data includes information in detail as depicted in FIG. 14.

FIG. 14 is a diagram illustrating stroke arrangement data according to the present embodiment.

As illustrated in FIG. 14, one stroke arrangement data includes a plurality of items of stroke data. Further, one item of stroke data indicates stroke data ID that identifies that stroke data, the start time at which the writing of one item of stroke starts, the end time at which the writing of one item of stroke ends, the color of the stroke, the width of the stroke, and the coordinate arrangement data ID that identifies the arrangement of way points of the stroke. For example, when the user draws an alphabet "S" with the electronic stylus 4 with a single stroke, one item of stroke data ID is assigned to the single character of alphabet "S". However, when the user draws an alphabet "T" with the electronic stylus 4 with two strokes, two items of stroke data ID are assigned to the single character of alphabet "T".

The coordinate arrangement data includes information in detail as depicted in FIG. 15.

FIG. 15 is a diagram illustrating an example data structure of the coordinate arrangement data, according to the present embodiment.

The coordinate arrangement data indicates several items of information including a point on the display 3 (X coordinate value, Y coordinate value), the difference in time (millisecond (ms)) when passing through this point since the start time of the stroke, and the writing pressure of the electronic stylus 4 on that point. In other words, a collection of several points depicted in FIG. 15 is indicated by one item of coordinate arrangement data as depicted in FIG. 14. For example, when the user draws an alphabet "S" using the electronic stylus 4 with a single stroke, a plurality of way points are passed through to complete the drawing of "S". Accordingly, the coordinate arrangement data indicates those multiple way points in the stroke drawing.

<<Operation>>

Next, the processes according to the present embodiment are described.

<Event Detection>

Figure 5:
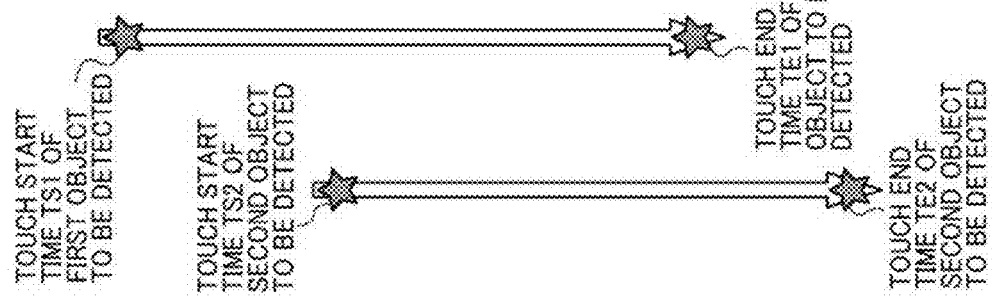
FIG. 5 is a diagram illustrating events detected by an event sorting unit, according to an embodiment of the present disclosure.

FIG. 5 is a diagram illustrating events detected by the event sorting unit 25, according to the present embodiment.

In FIG. 5, events that are detected earlier are depicted on the upper side, and events that are detected later are depicted on the lower side. In FIG. 5, the touchdown events are depicted in the column on the left, and the touch-move events are depicted in the column in the center. Moreover, the touch-up events are depicted in the column on the right. FIG. 5 illustrates an example case where two objects to be detected are detected by coordinate detector 22 between the touch start time ts2 of the second object to be detected and the touch end time te1 of the first object to be detected.

When a finger of the user's hand H touches the screen of the display 3, the coordinate detector 22 outputs to the event determining unit 251 the coordinates of the contact portion HT1 where the hand H touches the display 3, the size of the contact portion HT1, and the time at which events occurred. Upon receiving, for example, the coordinates of the contact portion HT1, the event determining unit 251 detects a touchdown event (step S1). Once the touchdown event is detected, the event determining unit 251 generates ID "1" of the contact portion HT1. The event determining unit 251 output to the mode determining unit 252 the coordinates of the contact portion HT1, the size of the contact portion HT1, the time at which the event occurred, the ID "1" generated in the step S1, and "TouchDown" indicating the type of event. An example data that is output from the event determining unit 251 is depicted in Table 2.

TABLE 2

| TouchDown | |
| --- | --- |
| ID | n |
| Coordinates | (x, y) |
| Size | (w, h) |
| Time at which events occurred | 2016 Jun. 30 10:32 |

Subsequently, when the finger of the user's hand H moves while maintaining the touch on the screen of the display 3, the coordinate detector 22 outputs to the event determining unit 251 the coordinates of the contact portion HT1 after the movement, the size of the contact portion HT1, and the time at which the event occurred. When it is determined that the distance between the previously input coordinates of the contact portion HT1 and the newly input coordinates is equal to or shorter than a predetermined threshold, the event determining unit 251 detects a touch-move event (step S2). The predetermined threshold is a set value indicating the maximum distance movable by human stroke drawing operation. The event determining unit 251 outputs to the mode determining unit 252 the coordinates of the contact portion HT1, the size of the contact portion HT1, the time at which the event occurred, "TouchMove" indicating the type of event, and the ID of the contact portion HT1.

Subsequently, when a part of the user's hand H further moves while maintaining the touch on a touch panel T illustrated in FIG. 4, the event determining unit 251 detects a touch-move event (step S3). The processes in the step S3 are similar to those of the step S2 as described above.

Subsequently, when another finger of the user's hand H touches the screen of the display 3, the coordinate detector 22 outputs to the event determining unit 251 the coordinates and the size of the contact portion HT2 at which such another finger touches the screen of the display 3, and the time at which the event occurred. When the distance between the previously input coordinates of the contact portion HT1 and the newly input coordinates of the contact portion HT2 is determined to exceed a predetermined threshold, the event determining unit 251 detects a touch-down event (step S4). Once the touchdown event is detected, the event determining unit 251 generates the ID "2" of the contact portion HT2. The event determining unit 251 outputs the coordinates of the contact portion HT2, the size of the contact portion HT2, the time at which the event occurred, the ID "2" generated in the step S4, and "TouchDown" indicating the type of event.

Subsequently, when the finger of the user's hand H or another finger of the user's hand H further moves while maintaining the touch on the screen of the display 3, the event determining unit 251 detects a touch-move event (steps S5, S6, S7, S8, S10). The processes in the steps S5, S6, S7, S8, and S10 are similar to those of the step S2 as described above. However, when a movement of the contact portion HT1 is detected, the event determining unit 251 outputs the ID "1", and when a movement of the contact portion HT2 is detected, the event determining unit 251 outputs the ID "2".

The finger of the user's hand H is detached from the touch panel T and the contact portion HT1 is no longer detected, the coordinate detector 22 detects a touch-up event of the contact portion HT1 (step S9). The event determining unit 251 outputs the coordinates of the contact portion HT1, the size of the contact portion HT1, the time at which the event occurred, "TouchUP" indicating the type of event, and the ID "1" of the contact portion HT1, which are lastly input from coordinate detector 22, to the mode determining unit 252.

When another finger of the user's hand H is detached from the touch panel T and the contact portion HT2 is no longer detected, the coordinate detector 22 detects a touch-up event of the contact portion HT2 (step S11). The event determining unit 251 outputs the coordinates of the contact portion HT2, the size of the contact portion HT2, the time at which the event occurred, "TouchUP" indicating the type of event, and the ID "2" of the contact portion HT2, which are lastly input from coordinate detector 22, to the mode determining unit 252.

<Mode Determination>

Next, the processes that are performed by the mode determining unit 252 are described.

Figure 6:
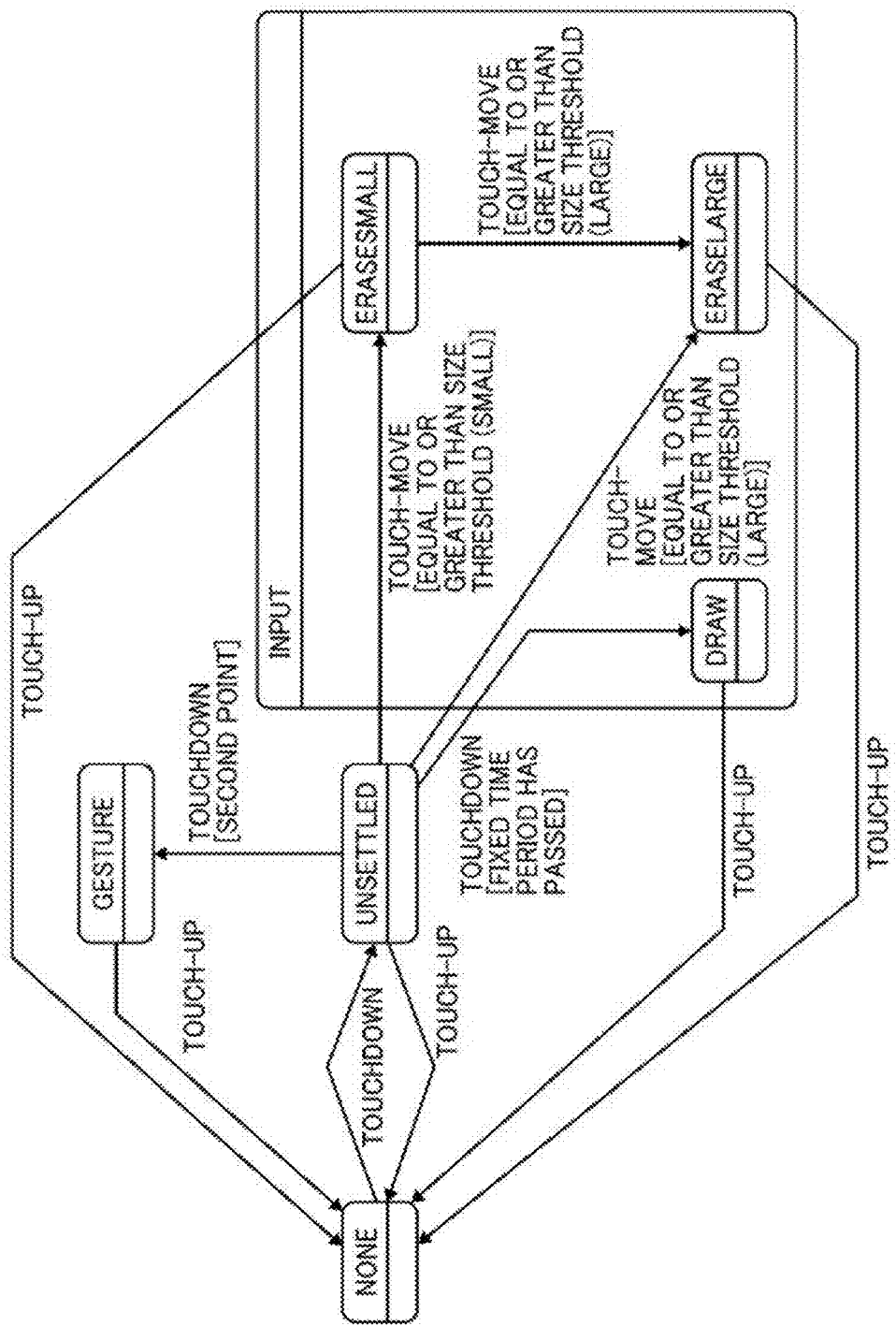
FIG. 6 is a conceptual diagram illustrating examples of state transition of the operation mode, according to an embodiment of the present disclosure.

FIG. 6 is a conceptual diagram illustrating examples of state transition of the operation mode, according to the present embodiment.

As illustrated in the diagram of state transition of FIG. 6, the operation mode changes depending on a condition such as an event or time. In FIG. 6, the operation modes "Draw", "EraseSmall", and "EraseLarge" belong to the operation mode "Input". In the operation mode "Input", a single operation request is input by a single object. The operation mode "Draw" is a mode where an image is displayed on a contact portion of an object. The operation mode "EraseSmall" is a mode where an image in a relatively small area of a contact portion with an object is erased. The operation mode "EraseLarge" is a mode where an image in a relatively large area of a contact portion with an object is erased. Note that the erasure of an image includes a process of controlling the image being displayed so as not to be displayed any longer. In these processes, the electronic whiteboard 2 may delete the image data for reproducing the image from the storage area of the electronic whiteboard 2, or may control the relevant image data so as not to be output to the display 3 without the deletion of the image data. In the operation mode "Gesture", a single operation request is input by two objects. The operation in the operation mode "Gesture" includes, for example, pinch in, pinch out, and flipping pages. The operation mode "Unsettled" indicates a temporary operation mode to be set to until the operation mode is determined to be set to the operation mode "Gesture" or "Input".

Figure 7:
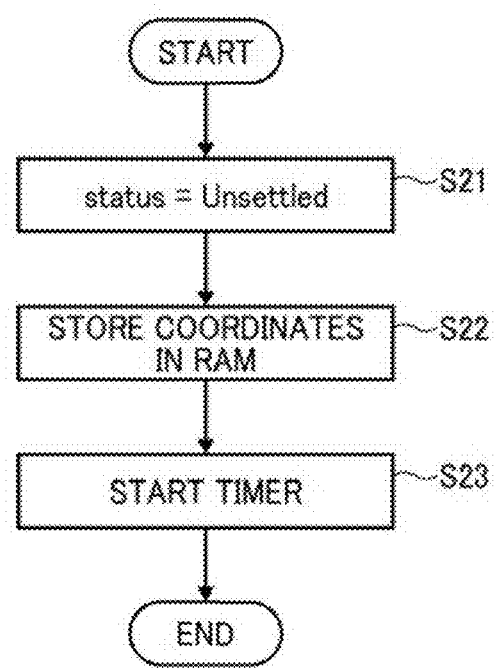
FIG. 7 is the first flowchart of mode determination processes, according to an embodiment of the present disclosure.
Figure 8:
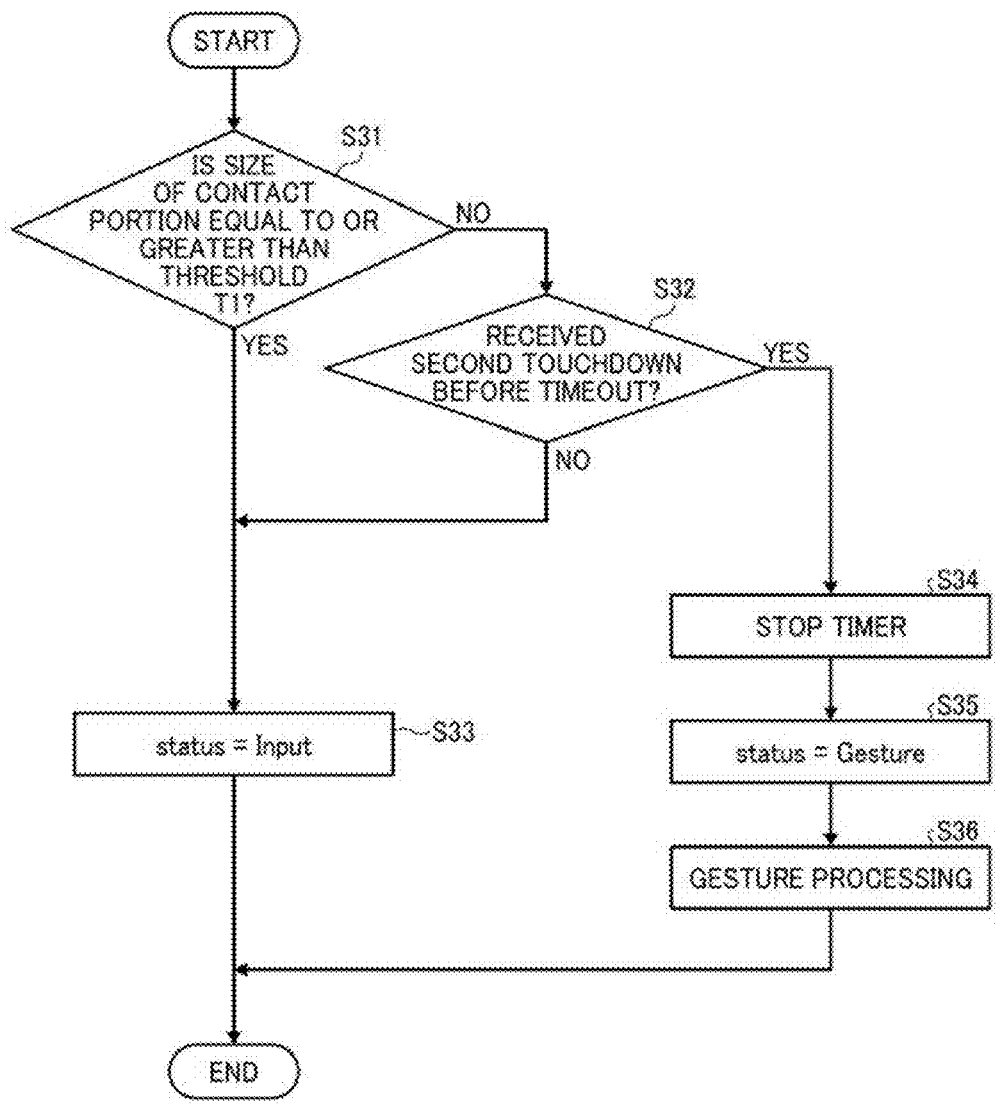
FIG. 8 is the second flowchart of mode determination processes, according to an embodiment of the present disclosure.
Figure 9:
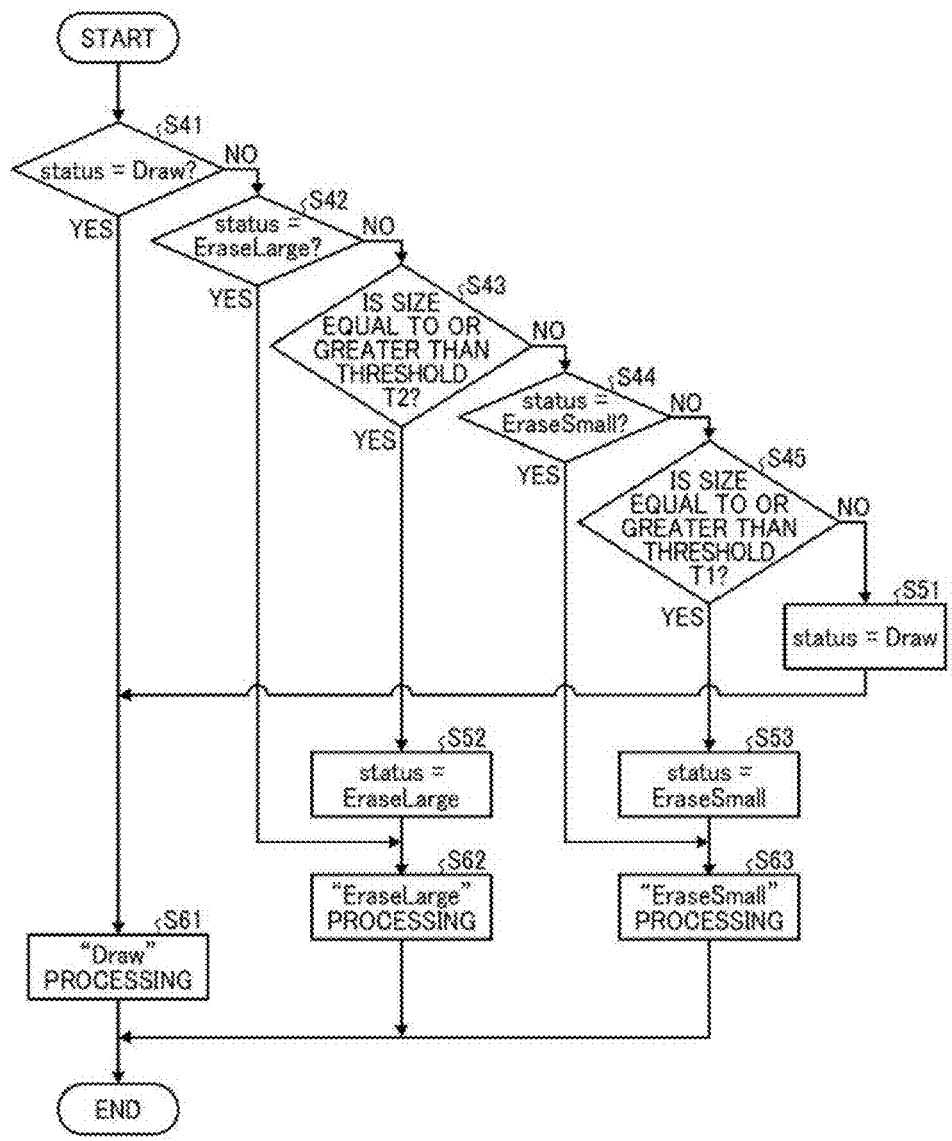
FIG. 9 is the third flowchart of mode determination processes, according to an embodiment of the present disclosure.

FIG. 7 to FIG. 9 are flowcharts of the mode determination processes according to the present embodiment.

The mode determination processes in accordance with the rules of the state transition illustrated in FIG. 6 are described with reference to FIG. 7 to FIG. 9.

<Touchdown Event>

The mode determining unit 252 sets an operation mode that indicates the operation specified by an object, for each contact portion of the object. Due to a touchdown of a finger of the hand H, the coordinates, the size, and the ID of the contact portion HT1, and the event "TouchDown" are input from the event determining unit 251 to the mode determining unit 252 (see step S1), the mode determining unit 252 sets the operation mode of the contact portion HT1 to "Unsettled" (step S21). Moreover, the mode determining unit 252 stores the set operation mode "Unsettled" in the RAM 203 in association with the coordinates, the size, the ID, and the time at which the event occurred, each of which is sent from the event determining unit 251 (step S22).

The mode determining unit 252 starts the timer 255 after the event "TouchDown" has occurred (step S23). The timer 255 that is started in the step S23 operates until the timer 255 times-out as a predetermined length of time has elapsed or until the mode determining unit 252 stops the timer 255. Note also that the timer 255 sets the time-out flag 253 to "False" when started and sets the time-out flag 253 to "True" when stopped.

Subsequently, when the event "TouchDown" is input as the second object is detected while the timer 255 is operating, i.e., when the time-out flag 253 indicates "False", one operation mode "Gesture" is set to the first object and the second object in the processes as described below. Due to this configuration, mode determination processes are not performed for an event that is caused by the second object.

<Touch-Move Event>

Subsequently, the mode determination processes when a touch-move event is input from the event determining unit 251 to the mode determining unit 252 are described with reference to FIG. 8.

When the coordinates, the size, and the ID of the contact portion HT1, and the event "TouchMove" are input from the event determining unit 251 to the mode determining unit 252 (see, for example, step S2), the processes depicted in FIG. 8 start.

The mode determining unit 252 determines whether the size of a contact portion HT1 (for example, (5, 8)) sent from the event determining unit 251 is equal to or greater than a threshold T1 (step S31). Note also that according to an embodiment of the present disclosure, a threshold T1 indicates a size "3" where touching of three fingers is assumed, and a threshold T2 indicates a size "6" where touching of a palm of a hand is assumed. When the width and the height in the size of the contact portion HT1 are different from each other, the mode determining unit 252 may compare the larger one of the width and the height with the threshold T1.

When it is determined that the size of the contact portion HT1 is not equal to or greater than the threshold T1 ("NO" in the step S31), the mode determining unit 252 determines whether the event "TouchDown" caused by touching of the second object is received from the event determining unit 251 before the timer 255 times-out (step S32).

When it is determined to be "YES" in the step S31 or when it is determined to be "NO" in the step S32, the mode determining unit 252 sets the operation mode of the contact portion HT1 to "Input" (step S33).

When it is determined to be "YES" in the step S32, the mode determining unit 252 stops the timer 255 (step S34). Moreover, the mode determining unit 252 sets the operation mode of the contact portions HT1 and HT2 to "Gesture" (step S35). In this configuration, the mode determining unit 252 sends the operation mode "Gesture" in addition to the coordinates, the size, the ID, and the time at which the event occurred, which are sent from the event determining unit 251, to the gesture processing unit 27. When the information including the coordinates, the sizes, the times at which events occurred, and the ID is stored in the RAM 203, the mode determining unit 252 sends the stored several kinds of information to the gesture processing unit 27 (step S36). Due to this configuration, when the operation mode is not yet determined, the data of the contact portions HT1 and HT2 stored in the RAM 203 is sent to the gesture processing unit 27 together with the operation mode "Gesture". After the data is sent, the mode determining unit 252 deletes the information including the coordinates, the sizes, the times at which events occurred, and the ID stored in the RAM 203.

The gesture processing unit 27 performs the processes of the operation mode "Gesture" based on the data sent from the mode determining unit 252. For example, when the coordinates sent from the mode determining unit 252 indicate that the distance between the contact portion HT1 and the contact portion HT2 is shortened as the time passes by, the gesture processing unit 27 sends a pinch-in request to the display processing unit 29. Alternatively, when the coordinates sent from the mode determining unit 252 indicate that the distance between the contact portion HT1 and the contact portion HT2 is lengthened as the time passes by, the gesture processing unit 27 sends a pinch-out request to the display processing unit 29. The display processing unit 29 outputs the image data for display, which has been modified in response to a request sent from the gesture processing unit 27, to the display 3.

When the operation mode is set to "Input" in the step S33, the mode determining unit 252 sets a more detailed operation mode in one of the operation modes "Draw", "EraseSmall", and "EraseLarge". Firstly, the mode determining unit 252 determines whether the operation mode corresponding to the ID "1" sent from the event determining unit 251 together with the event "TouchMove" is "Draw" (step S41). Note also that when the operation mode of the contact portion HT1 is set to "Draw" in a step S51, which will be described later in detail, the mode determining unit 252 stores the ID "1" of the contact portion HT1 and the operation mode "Draw" in the RAM 203 in association with each other. When the operation mode "Draw" is already set in the previous touch-move event at the contact portion HT1, it is determined to be "YES" in the step S41 by the mode determining unit 252 referring to the data stored in the RAM 203.

When it is determined to be "YES" in the step S41, the mode determining unit 252 sends the operation mode "Draw" in addition to the coordinates, the size, the ID, and the time at which the event occurred, which are sent from the event determining unit 251 together with the event "TouchMove", to the stroke processing unit 32 (step S61). When the information including the coordinates, the sizes, the times at which events occurred, and the ID is stored in the RAM 203, the mode determining unit 252 sends the stored several kinds of information to the stroke processing unit 32. Due to this configuration, when the operation mode is not yet determined, the data of the contact portion HT1 stored in the RAM 203 is sent to the stroke processing unit 32 together with the operation mode "Draw". After the data is sent, the mode determining unit 252 deletes the information including the coordinates, the sizes, the times at which events occurred, and the ID stored in the RAM 203.

The stroke processing unit 32 performs the processes in the operation mode "Draw" based on the data sent from the mode determining unit 252. In these processes, the stroke processing unit 32 generates stroke arrangement data for the coordinates sent from the mode determining unit 252, and stores the generated stroke arrangement data in the page data memory 300 (see Table 1, FIG. 14, and FIG. 15). The display processing unit 29 outputs the image data of the hand-drawn image generated according to the updated stroke arrangement data to the display 3. Due to this configuration, a hand-drawn image is displayed on the screen of the display 3, at the coordinates sent from the mode determining unit 252.

Figure 10A:
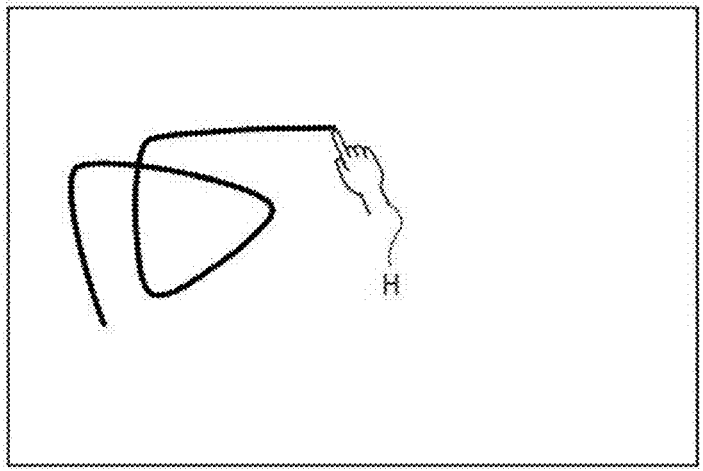
FIG. 10A, FIG. 10B, and FIG. 10C are diagrams each illustrating an example display according to an embodiment of the present disclosure.

FIG. 10A is a diagram illustrating an example image on the display in the step S61, according to the present embodiment.

When it is determined to be "NO" in the step S41, the mode determining unit 252 determines whether the operation mode corresponding to the ID "1" sent from the event determining unit 251 together with the event "TouchMove" is "EraseLarge" (step S42). When the operation mode of the contact portion HT1 is set to "EraseLarge" in a step S52, which will be described later in detail, the mode determining unit 252 stores the ID "1" of the contact portion HT1 and the operation mode "EraseLarge" in the RANI 203 in association with each other. When the operation mode "EraseLarge" is already set in the previous touch-move event at the contact portion HT1, it is determined to be "YES" in the step S42 by the mode determining unit 252 referring to the data stored in the RAM 203.

When it is determined to be "YES" in the step S42, the mode determining unit 252 sends the operation mode "EraseLarge" in addition to the coordinates, the size, the ID, and the time at which the event occurred, which are sent from the event determining unit 251 together with the event "TouchMove", to the stroke processing unit 32 (step S62).

The stroke processing unit 32 performs the processes of the operation mode "EraseLarge" based on the data sent from the mode determining unit 252. The stroke processing unit 32 deletes from the page data memory 300 the stroke arrangement data included in an area A2 (for example, 8×8 dots) around the coordinates sent from the mode determining unit 252. The display processing unit 29 outputs the image data generated according to the updated stroke arrangement data to the display 3. Due to this configuration, an image from which the hand-drawn image included in the area A2 has been erased is displayed on the screen of the display 3.

Figure 10B:
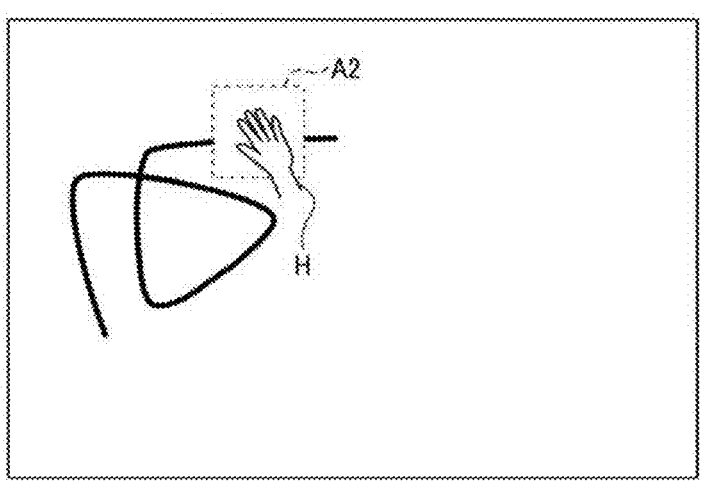

FIG. 10B is a diagram illustrating an example image on the display in the step S62, according to the present embodiment.

When it is determined to be "NO" in the step S42, the mode determining unit 252 determines whether the size (for example, (6, 4)) sent from the event determining unit 251 together with the event "TouchMove" is equal to or greater than the threshold T2 (for example, "6") (step S43). According to an embodiment of the present disclosure, when the width (for example, "6") and the height (for example, "4") in the size are different from each other, the mode determining unit 252 may compare the larger value (for example, 6) of the size with the threshold T2 (for example, 6).

When it is determined to be "YES" in the step S43, sets the operation mode of the contact portion HT1 to "EraseLarge" (step S52). The mode determining unit 252 stores the set operation mode "EraseLarge" in the RANI 203 in association with the ID "1" of the contact portion HT1. When the timer 255 has not timed-out, the mode determining unit 252 stops the timer 255. Further, the mode determining unit 252 sends the operation mode "EraseLarge" in addition to the coordinates, the size, the ID, and the time at which the event occurred, which are sent from the event determining unit 251, to the stroke processing unit 32 (step S62). When the hand H or the like touches the touch panel, the contact portion HT1 of the size smaller than the threshold T2 is firstly formed, and the contact portion HT1 of the size equal to or larger than the threshold T2 may then be formed. In such cases, even when the operation mode of the contact portion HT1 is set to "EraseSmall" in a state where the size of the contact portion HT1 is smaller than the threshold T2 at first, the mode determining unit 252 sets the operation mode "EraseLarge" when the size of the contact portion HT1 exceeds the threshold T2 subsequently.

When the information including the coordinates, the sizes, the times at which events occurred, and the ID is stored in the RAM 203, the mode determining unit 252 sends the stored several kinds of information to the stroke processing unit 32. Due to this configuration, when the operation mode is not yet determined, the data of the contact portion HT1 stored in the RANI 203 is sent to the stroke processing unit 32 together with the operation mode "EraseLarge". The mode determining unit 252 deletes the sent information including the coordinates, the sizes, the times at which events occurred, and the ID from the RAM 203. The stroke processing unit 32 and the display processing unit 29 that have received the operation mode "EraseLarge" in addition to the coordinates or the like follow the operation mode "EraseLarge" and perform operations to erase the hand-drawn image included in the area A2.

When it is determined to be "NO" in the step S43, the mode determining unit 252 determines whether the operation mode corresponding to the ID "1" sent from the event determining unit 251 together with the event "TouchMove" is "EraseSmall" (step S44). When the operation mode of the contact portion HT1 is set to "EraseSmall" in a step S53, which will be described later in detail, the mode determining unit 252 stores the ID "1" of the contact portion HT1 and the operation mode "EraseSmall" in the RAM 203 in association with each other. When the operation mode "Erase Small" is already set in the previous touch-move event at the contact portion HT1, it is determined to be "YES" in the step S44 by the mode determining unit 252 referring to the data stored in the RAM 203.

When it is determined to be "YES" in the step S44, the mode determining unit 252 sends the operation mode "EraseSmall" in addition to the coordinates, the size, the ID, and the time at which the event occurred, which are sent from the event determining unit 251 together with the event "Touch-Move", to the stroke processing unit 32 (step S63).

The stroke processing unit 32 performs the processes in the operation mode "EraseSmall" based on the data sent from the mode determining unit 252. The stroke processing unit 32 deletes from the page data memory 300 the stroke arrangement data included in an area A1 (for example, 2×2 dots) around the coordinates sent from the mode determining unit 252. The display processing unit 29 outputs the image data generated according to the updated stroke arrangement data to the display 3. Due to this configuration, an image from which the hand-drawn image included in the area A1 has been erased is displayed on the screen of the display 3.

Figure 10C:
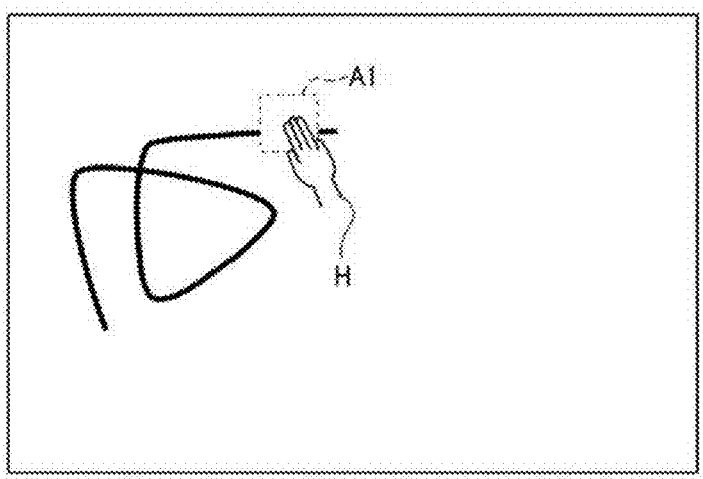

FIG. 10C is a diagram illustrating an example image on the display in the step S63, according to the present embodiment.

When it is determined to be "NO" in the step S44, the mode determining unit 252 determines whether the size (for example, (3, 2)) sent from the event determining unit 251 together with the event "TouchMove" is equal to or greater than the threshold T1 (for example, "3") (step S45). According to an embodiment of the present disclosure, when the width (for example, "3") and the height (for example, "2") in the size are different from each other, the mode determining unit 252 may compare the larger value (for example, 3) of the size with the threshold T1 (for example, 3).

When it is determined to be "YES" in the step S45, the operation mode of the contact portion HT1 is set to "EraseSmall" (step S53). The mode determining unit 252 stores the set operation mode "EraseSmall" in the RAM 203 in association with the ID "1" of the contact portion HT1. When the timer 255 has not timed-out, the mode determining unit 252 stops the timer 255. Further, the mode determining unit 252 sends the operation mode "EraseSmall" in addition to the coordinates, the size, the ID, and the time at which the event occurred, which are sent from the event determining unit 251, to the stroke processing unit 32 (step S63). When the information including the coordinates, the sizes, the times at which events occurred, and the ID is stored in the RAM 203, the mode determining unit 252 sends the stored several kinds of information to the stroke processing unit 32. Due to this configuration, when the operation mode is not yet determined, the data of the contact portion HT1 stored in the RAM 203 is sent to the stroke processing unit 32 together with the operation mode "EraseSmall". The mode determining unit 252 deletes the sent information including the coordinates, the sizes, the times at which events occurred, and the ID from the RAM 203. The stroke processing unit 32 and the display processing unit 29 that have received the operation mode "EraseSmall" in addition to the coordinates or the like follow the operation mode "EraseSmall" and perform operations as described above to erase the hand-drawn image included in the area A1.

When it is determined to be "NO" in the step S45, the operation mode of the contact portion HT1 is set to "Draw" (step S51). The mode determining unit 252 stores the set operation mode "Draw" in the RANI 203 in association with the ID "1" of the contact portion HT1. When the timer 255 has not timed-out, the mode determining unit 252 stops the timer 255. The mode determining unit 252 sends the operation mode "Draw" in addition to the coordinates, the size, the ID, and the time at which the event occurred, which are sent from the event determining unit 251, to the stroke processing unit 32 (step S61). When the information including the coordinates, the sizes, the times at which events occurred, and the ID is stored in the RAM 203, the mode determining unit 252 sends the stored several kinds of information to the stroke processing unit 32. Due to this configuration, when the operation mode is not yet determined, the data of the contact portion HT1 stored in the RAM 203 is sent to the stroke processing unit 32 together with the operation mode "Draw". The mode determining unit 252 erases from the RAM 203 the sent information including the coordinates, the sizes, the times at which events occurred, and the ID. The stroke processing unit 32 and the display processing unit 29 that have received the operation mode "Draw" in addition to the coordinates or the like follow the operation mode "Draw" and perform operations to display a hand-drawn image.

<<<Modification A of Example Embodiment>>>

Next, a modification of the embodiments of the present invention is described. In particular, differences in configuration from the embodiments as described above are described.

Figure 11:
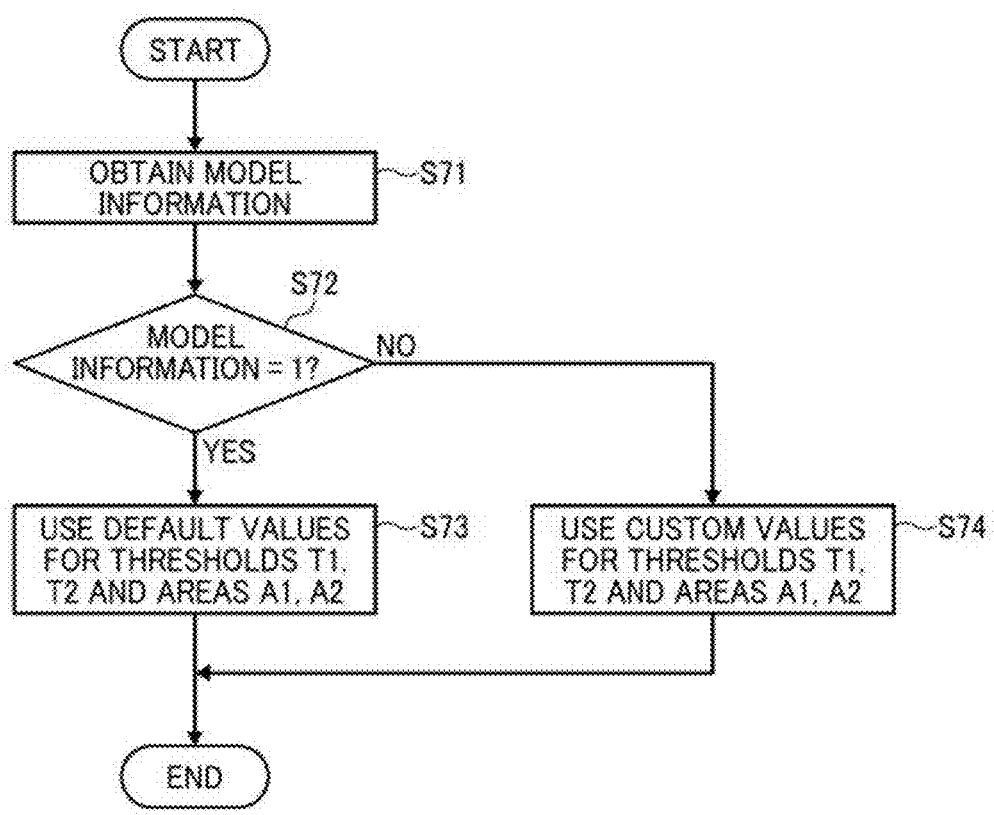
FIG. 11 is a flowchart of the operation of setting an erasing area, according to a modification of an embodiment of the present disclosure.

FIG. 11 is a flowchart of the operation of setting an erasing area, according to modification A of an embodiment of the present disclosure.

When the electronic whiteboard 2 is started, the mode determining unit 252 obtains model information from the display 3 (step S71). The model information may include, for example, the identification information of the model, or data concerning the resolution of the screen of the display 3 or the method of reading a contact portion. Hereinafter, cases in which the model information is the identification information "1" or "2" of the model are described. According to an embodiment of the present disclosure, the model of the identification information "1" has a higher screen resolution than the model of the identification information "2".

The mode determining unit 252 determines whether the obtained model information is "1" (step S72). In the memory 2000, "3" and "6" are stored as default thresholds T1 and T2, respectively, and "2" and "4" are stored as custom thresholds T1 and T2, respectively. Moreover, in the memory 2000, "2×2" and "8×8" are stored as default deleting areas A1 and A2, respectively, and "1.5×1.5" and "6×6" are stored as custom deleting areas A1 and A2, respectively. When the model information obtained in the step S72 is determined to be "1", the mode determining unit 252 determines that the default thresholds T1 and T2 and the default deleting areas A1 and A2 are to be used (step S73). Due to this configuration, in each of the steps S52, S94, S62, and S104, one of the default thresholds T1 and T2 and the default deleting areas A1 and A2 is used.

When the model information obtained in the step S72 is determined to be "2", the mode determining unit 252 determines that the custom thresholds T1 and T2 and the custom deleting areas A1 and A2 are to be used (step S74). Due to this configuration, in each of the steps S52, S94, S62, and S104, one of the custom thresholds T1 and T2 and the custom deleting areas A1 and A2 is used.

According to the modification A of an embodiment, the thresholds T1 and T2 and the deleting areas A1 and A2 to be used for determining processes can be set to any desired values according to the resolution. Due to this configuration, for example, when the resolution is high, the detecting area and the erasing area of the contact portion can be adjusted to the actual implementation, for example, by setting the thresholds T1 and T2 and the deleting areas A1 and A2 may to large values. In the modification A of an embodiments of the present disclosure, the thresholds T1 and T2 and the deleting areas A1 and A2 to be used for determining the size are set according to the resolution. However, the thresholds T1 and T2 and the deleting areas A1 and A2 may be set to varying values as desired, for example, according to the precision of the method of reading a contact portion.

<<Modification C of Example Embodiment>>

Next, a modification B of the embodiments of the present disclosure is described. In particular, differences in configuration from the embodiments as described above are described. Once coordinates are stored in the RANI 203 in the step S22, the display processing unit 29 refers to the coordinates stored in the RAM 203, and controls the display to display a temporary image at the obtained coordinates.

Subsequently, the coordinates stored in the RAM 203 are deleted after the operation mode is determined to be one of the operation modes "Gesture", "EraseLarge", and "EraseSmall" in the step S45, the step S53, and the step S63, the display processing unit 29 gives instructions to erase the temporary image.

Also when the coordinates stored in the RANI 203 are deleted after the operation mode "Draw" is output in the step S44, the display processing unit 29 gives instructions to erase the temporary image at the to-be-deleted coordinates. However, in such a configuration, the stroke processing unit 32, generates stroke arrangement data including the to-be-deleted coordinates. Due to this configuration, the display processing unit 29 displays an image at the above coordinates based on the generated stroke arrangement data.

<<<Modification C of Example Embodiment>>>

Next, a modification C of the embodiments of the present disclosure is described. In particular, differences in configuration from the embodiments as described above are described. In the modification C, the number of contact portions HT that are simultaneously detectable by the coordinate detector 22 is limited, for example, to five, due to its hardware limits or software limits. In the modification C, the memory 2000 stores therein a contact-portion management table. Table 3 is a diagram illustrating a contact-portion management table, according to the present embodiment.

TABLE 3

| ID | Coordinates | Operation Mode |
|---|---|---|
| 1 | (15, 16) | EraseSmall |
| 2 | | |
| 3 | | |
| 4 | | |
| 5 | | |

In the contact-portion management table, the ID of the five detectable contact portions HT, the coordinates of the contact portions HT, and the operation mode associated with the contact portions HT are stored in association with each other. When an event "TouchDown" is detected, the event determining unit 251 selects the ID to be associated with the contact portion HT of the touchdown, from the ID "2", "3", "4", and "5" stored in the records where the cells for coordinates are blank in the contact-portion management table of Table 3. The event determining unit 251 stores the coordinates of the contact portion HT in association with the selected ID in the contact-portion management table.

The mode determining unit 252 stores in the contact-portion management table the operation mode that is determined for the contact portion HT in association with the ID of the contact portion HT. Every time an event "TouchMove" at the contact portion HT is detected, the event determining unit 251 updates the coordinates that is associated with the ID of the contact portion HT in the contact-portion management table with the coordinates after the movement. When an event "TouchUP" at the contact portion HT is detected, the event determining unit 251 deletes the coordinates and the operation mode that are associated with the ID of the touched-up contact portion HT in the contact-portion management table.

When the user manipulates the electronic whiteboard 2 to delete an image, the user touches the display 3 with a relatively wider area of the hand H compared with when the user does writing operation. When a plurality of parts of the hand H touch the display 3 in the above operation, the coordinate detector 22 detects each one of the contact portions as an independent contact portion HT. Although the number of contact portions HT that are simultaneously detectable by the coordinate detector 22 is five, when a plurality of contact portions HT of one user's hand H are detected, writing operations or deleting operations by five people at the same time become impossible. Otherwise, for example, the operation mode "EraseSmall" is applied to some of the multiple contact portions HT, and for example, the operation mode "Draw" is applied to the other ones of the multiple contact portions HT. As a result, undesired operation may be executed. In order to deal with such a situation, the mode determining unit 252 in the modification C determines the operation mode based on the distance between the contact portion HT1 of the former touchdown and the contact portion HT2 of the latter touchdown.

Figure 12:
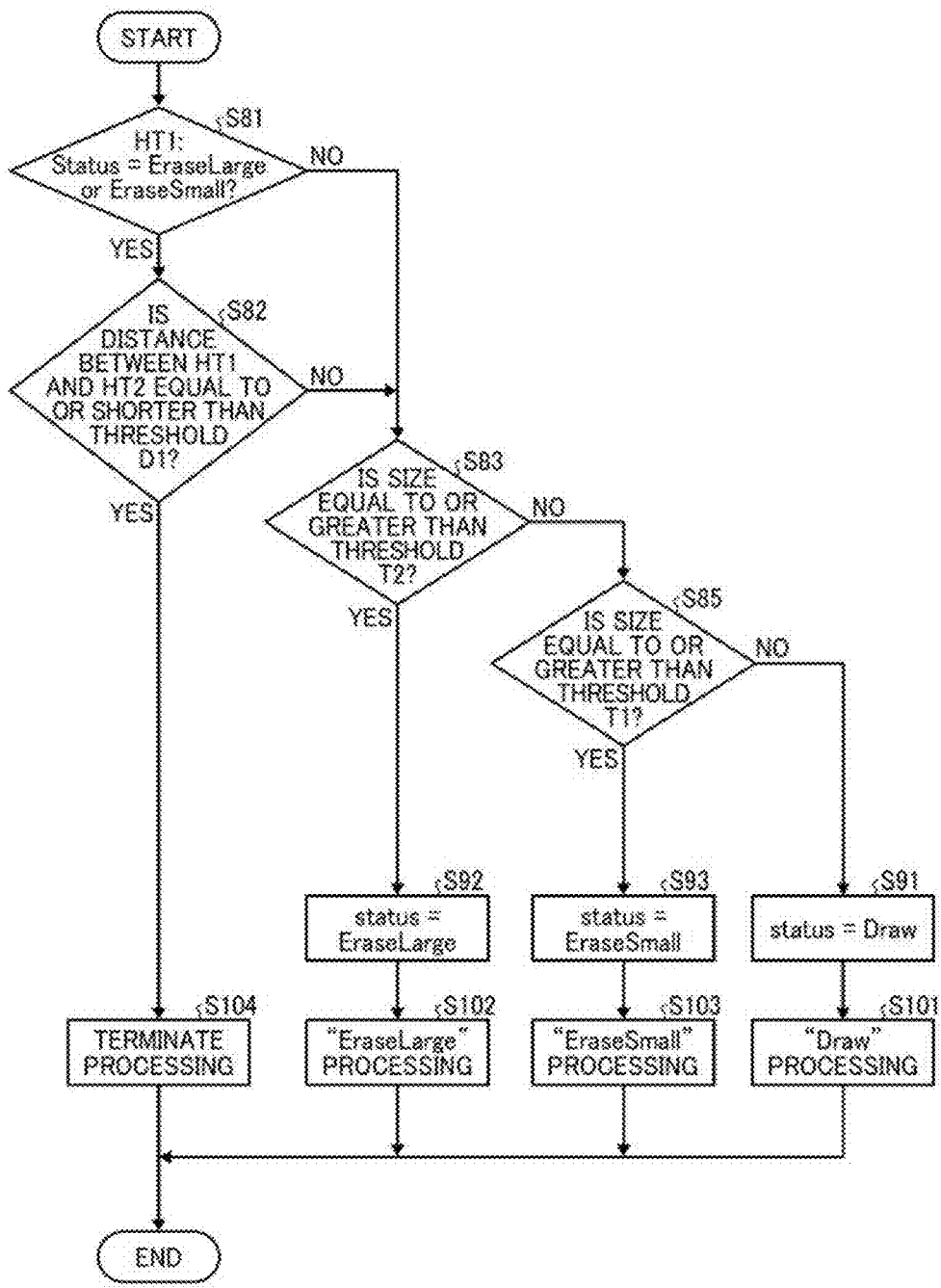
FIG. 12 is a flowchart of mode determination processes according to a modification of an embodiment of the present disclosure.

FIG. 12 is a flowchart of the mode determination processes according to a modification of the above embodiment.

The mode determination processes according to the present modification will be described with reference to FIG. 12. The processes in FIG. 12 start after the second touchdown is detected in the step S4 and then the operation mode for the second contact portion HT2 is determined to be "Input" in the step S33. Moreover, it is assumed that the hand H that touched the display 3 in the first touchdown has not touched-up at the timing of second touchdown. Due to this configuration, as depicted in Table 3, the coordinates of the contact portion HT1 of the first touchdown and the operation mode associated with the contact portion HT1 are stored in the contact-portion management table.

Firstly, the mode determining unit 252 determines whether the operation mode associated with the first contact portion HT1 is "EraseLarge" or "EraseSmall" (step S81). In these processes, the mode determining unit 252 refers to the contact-portion management table and determines whether the operation mode associated with the ID of the first contact portion HT1 is "EraseLarge" or "EraseSmall".

When it is determined to be "YES" in the step S81, the mode determining unit 252 calculates and obtains the distance between the contact portion HT1 and the contact portion HT2. In these processes, the mode determining unit 252 uses the coordinates stored in the contact-portion management table as the coordinates of the first contact portion HT1. Moreover, the mode determining unit 252 uses the coordinates sent from the event determining unit 251 together with the event "TouchDown" as the coordinates of the second contact portion HT2. Note also that the mode determining unit 252 may calculate the distance in any measurement unit such as millimeters (mm). In this configuration, the event determining unit 251 divides the distance calculated from the coordinates of the contact portions HT1 and HT2 by the density (for example, dot/mm) of the pixels on the display 3, to obtain the distance expressed in any measurement unit.

A method of calculating the distance between the contact portion HT1 and the contact portion HT2 may be any predetermined method, and is not limited to the methods as described above. When the image in the area A1 or the area A2 that includes the first contact portion HT1 has been erased, the mode determining unit 252 the distance between the contact portion HT and the center point of the area A1 or the area A2 may be calculated and obtained as the distance between the contact portion HT1 and the contact portion HT2.

The mode determining unit 252 determines whether the calculated distance between the contact portion HT1 and the contact portion HT2 equal to or shorter than a prescribed threshold D1 (step S82). The threshold D1 is not limited to any specific range of values, but may be, for example, 75 mm in view of a situation where two points of the palm of a hand unintentionally touch the display 3.

Figure 13A:
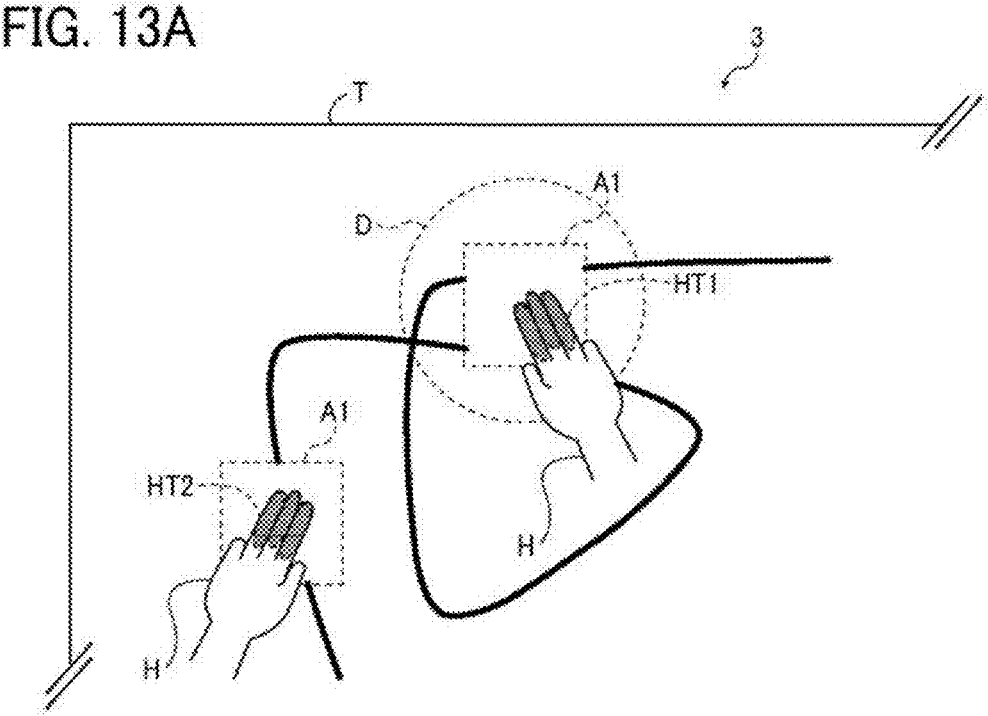
FIG. 13A and FIG. 13B are diagrams each illustrating erasing operation of an image on a display, according to a modification of an embodiment of the present disclosure.
Figure 13B:
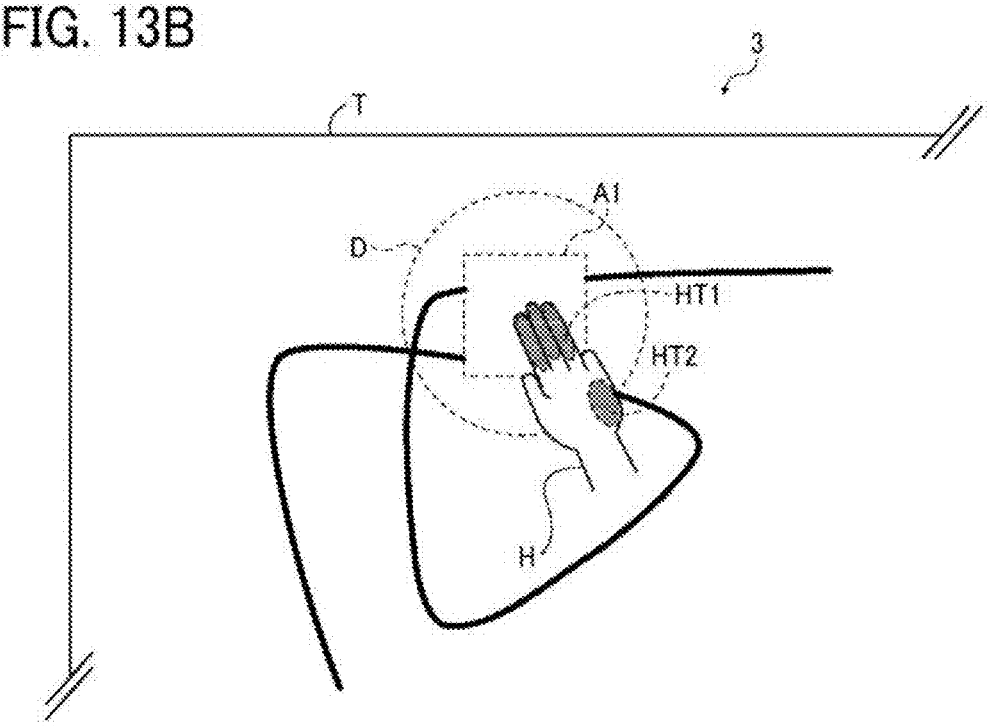

FIG. 13A and FIG. 13B are diagrams each illustrating erasing operation of an image on the display, according to the present embodiment.

As illustrated in FIG. 13A, when the contact portion HT2 is detected outside a circle D having the center at the contact portion HT1 with the radius of the threshold D1, it is determined to be "NO" in the step S82. As illustrated in FIG. 13B, when the contact portion HT2 is detected within the circle D having the center at the contact portion HT1 with the radius of the threshold D1, it is determined to be "YES" in the step S82.

When it is determined to be "YES" in the step S82, the mode determining unit 252 terminates the processes without performing the processes such as for drawing or erasure associated with the second touchdown (step S104). In other words, the mode determining unit 252 does not assign any of the operation modes "EraseLarge", "EraseSmall", and "Draw" to the contact portion HT2. Due to this configuration, none of the operations in the operation modes "EraseLarge", "EraseSmall", and "Draw" is performed for the contact portion HT2 (see FIG. 13B).

When it is determined to be "NO" in the step S81 or when it is determined to be "NO" in the step S82, the mode determining unit 252 selects and assign the operation mode to be associated with the second touchdown from "EraseLarge", "EraseSmall", and "Draw", and performs the processes according to the selected and assigned operation mode (steps S83 to S103). These processes are equivalent to the processes in the step S43, the step S52, and the step S62, the processes in the step S45, the step S53, and the step S63, or the processes in the step S51 and the step S61, as depicted in FIG. 9. However, at the timing when the event "TouchDown" occurs, the operation mode that is associated with the contact portion HT2 is not determined in advance. Due to this configuration, the processes in the step S41, the step S42, and the step S44, as illustrated in FIG. 9, are not performed.

In the processes in the steps S83 to S103, when the operation mode associated with the contact portion HT2 is selected from "EraseLarge", "EraseSmall", and "Draw", the processes selected by the mode determining unit 252 are performed (see FIG. 13A).

With the image processing method according to the embodiments as described above, after a touch of an object is detected by the contact sensor 215 (i.e., an example of a detector), the electronic whiteboard 2 (i.e., an example of an image processing apparatus) performs the processes related to the image displayed on the display 3 (i.e., an example of a display). The event determining unit 251 (i.e., an example of an acquisition unit) of the electronic whiteboard 2 obtains the data (i.e., an example of an obtaining process) indicating the size of a contact portion of an object. The timer 255 (i.e., an example of a measuring unit) of the electronic whiteboard 2 measures the length of time passed since a touch of the first object is detected by the contact sensor 215 (i.e., an example of a measuring process). The mode determining unit 252 (i.e., an example of a changing unit) of the electronic whiteboard 2 gives instructions to display the image at the contact portion or gives instructions to erase the image being displayed at the contact portion, based on the size data obtained by the event determining unit 251 and whether the second object is detected before a predetermined length of time has elapsed since the timer 255 started measuring, or gives instructions to change the image being di splayed based on the gesture operation made by the first object and the second object (i.e., an example of a changing process). Due to this configuration, the electronic whiteboard 2 can switch the operation mode "Input" and the operation mode "Gesture" for drawing or erasure, without requiring a user to input an operation mode.

When the size data that is obtained by the event determining unit 251 is equal to or greater than the threshold T1 (i.e., an example of a first threshold), the mode determining unit 252 of the electronic whiteboard 2 gives instructions to erase the image being displayed at the contact portion. Due to this configuration, for example, when an object such as a palm of a hand that forms a contact portion equal to or greater than the threshold T1 touches the screen of the display 3, the electronic whiteboard 2 can erase an image being displayed at the contact portion.

When the size data that is obtained by the event determining unit 251 is equal to or greater than the threshold T1 and less than the threshold T2 (i.e., an example of a second threshold), the mode determining unit 252 of the electronic whiteboard 2 gives instructions to erase the image included in the area A1 (i.e., an example of a first area) of the contact portion. When the size data that is obtained by the event determining unit 251 is equal to or greater than the threshold T2, the mode determining unit 252 of the electronic whiteboard 2 gives instructions to erase the image included in the area A2 (i.e., an example of a second area) of the contact portion. The area A2 is wider than the area A1. Due to this configuration, the dimension of the image to be erased can be changed according to the size of the contact portion.

When the size data indicating a size equal to or greater than the threshold T2 is obtained after the size data indicating a size that is equal to or greater than the threshold T1 and less than the threshold T2 is obtained by the event determining unit 251, the mode determining unit 252 of the electronic whiteboard 2 gives instructions to erase the image included in the area A1 of the contact portion and then gives instructions to erase the image included in the area A2 of the contact portion. Due to this configuration, when the size of the contact portion HT1 changes after a touch, the electronic whiteboard 2 can erase the desired area of image according to the size of the contact portion HT1.

When the size data that is obtained by the event determining unit 251 indicates a size smaller than the threshold T1 and the second object is detected before a predetermined length of time (i.e., an example of a prescribed time) has elapsed since the timer 255 started measuring, the mode determining unit 252 of the electronic whiteboard 2 gives instructions to change the image being displayed based on the gesture operation made by the first object and the second object. When the size data that is obtained by the event determining unit 251 is smaller than the threshold T1 and the second object is not detected before a predetermined length of time has elapsed since the timer 255 started measuring, the mode determining unit 252 of the electronic whiteboard 2 gives instructions to display the image at the contact portion. Due to this configuration, the electronic whiteboard 2 can distinguish a plurality of hand drawing operations by a plurality of objects from a single gesture operation by a plurality of objects.

The RAM 203 (i.e., an example of a memory) of the electronic whiteboard 2 stores the data indicating the coordinates of the contact portion HT1 of an object detected by the contact sensor 215 before the mode determining unit 252 determines the operation mode to one of the operation modes "Draw", "EraseLarge", "EraseSmall", and "Gesture". The electronic whiteboard 2 controls the display to display an image based on the data indicating the coordinates stored in the RAM 203. Due to this configuration, the electronic whiteboard 2 can display a temporary image at the contact portion HT1 before the operation mode is set to one of the operation modes "Draw", "EraseLarge", "EraseSmall", and "Gesture".

After the operation mode is determined to be one of the operation modes "Draw", "EraseLarge", "EraseSmall", and "Gesture", the mode determining unit 252 (i.e., an example of an erasing unit) erases the data indicating the coordinates stored in the RAM 203. Due to this configuration, the electronic whiteboard 2 can terminate the display of the temporary image.

The mode determining unit 252 of the electronic whiteboard 2 obtains the model information from the display 3. The mode determining unit 252 of the electronic whiteboard 2 sets the thresholds T1 and T2 for the size of a contact portion and the deleting areas A1 and A2 according to the obtained model information. Due to this configuration, the electronic whiteboard 2 can set the thresholds and areas according to the model of the display 3.

When the contact of the second contact portion HT2 is detected by the contact sensor 215 while the processes in the operation mode "EraseLarge" or "EraseSmall" are being performed at the first contact portion HT1 by the mode determining unit 252, the mode determining unit 252 calculates and obtains the distance between the contact portion HT1 and the contact portion HT2. When the obtained distance is greater than the threshold D1 (third threshold), the mode determining unit 252 perform the processes in one of the operation modes "EraseLarge", "EraseSmall", and "Draw". When the obtained distance is equal to or less than the threshold D1, the mode determining unit 252 terminates the processes. Due to this configuration, when the number of contact portions HT that are simultaneously detectable by the coordinate detector 22 is limited, a situation can be prevented in which a plurality of parts of the hand H touch the display 3 in an erasing operation by a single user and multiple contact portions HT are detected and thus operation by another user is restricted.

The programs designed for the electronic whiteboard 2 may be recorded on a computer-readable recording medium for distribution in an installable or executable file format. Examples of such recording medium include, but not limited to, compact disc-recordable (CD-R), digital versatile disc (DVD), and Blu-ray disc. In addition, a memory storing any one of the above-described control programs, such as a recording medium including a CD-ROM or an HDD, may be provided in the form of a program product to users within a certain country or outside that country.

The electronic whiteboard 2 may be implemented as a single apparatus or a plurality of apparatuses to which divided portions (functions) are allocated.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image processing apparatus, comprising:
   circuitry configured to
      obtain size data of a contact portion of a first object on a display,
      measure a time passed since a touch of the first object is detected by a detector, and
      control display of an image to be displayed at the contact portion of the first object or a displayed image to be erased from the contact portion of the first object, based on the obtained size data and based on whether a second object is detected before a prescribed time has elapsed since the circuitry started measuring the time, and control display of an image to be changed based on an operation made by the first object and the second object,
   wherein when the obtained size data is less than a first threshold and the second object is detected before the prescribed time has elapsed since the circuitry started measuring the time, the circuitry is further configured to control display of the image to be changed based on an operation made by the first object and the second object, and when the obtained size data is less than a first threshold and the second object is not detected before the prescribed time has elapsed since the circuitry started measuring the time, the circuitry is further configured to control display of the image to be displayed at the contact portion of the first object.

2. The image processing apparatus according to claim 1, wherein when the obtained size data obtained by the circuitry is equal to or greater than the first threshold, the circuitry is further configured to control display of the displayed image to be erased from the contact portion of the first object.

3. The image processing apparatus according to claim 2, wherein when the obtained size data is equal to or greater than the first threshold and less than a second threshold, the circuitry is further configured to control display of a first image to be erased and included in a first area of the contact portion of the first object, when the obtained size data is equal to or greater than the second threshold, the circuitry is further configured to control display of a second image to be erased and included in a second area of the contact portion of the first object, and the second area is wider than the first area.

4. The image processing apparatus according to claim 3, wherein when the size data that is equal to or greater than the second threshold is obtained after the size data that is equal to or greater than the first threshold and less than the second threshold is obtained by the circuitry, the circuitry is further configured to firstly control the first image included in the first area of the contact portion of the first object to be erased, and secondly control the second image included in the second area of the contact portion of the first object to be erased.

5. The image processing apparatus according to claim 3, further comprising a memory to store data indicating coordinates of the contact portion of the first object, which is detected by the detector, before the circuitry determines to control display of the image to be displayed at the contact portion of the first object or the displayed image to be erased from the contact portion of the first object, or control display of the image to be changed based on the operation made by the first object and the second object, wherein the displayed image is displayed based on data indicating the coordinates stored in the memory.

6. The image processing apparatus according to claim 5, wherein the circuitry is further configured to erase, from the memory, data indicating coordinates of the contact portion, after the circuitry determines to control display of the image to be displayed at the contact portion of the first object or the displayed image to be erased from the contact portion of the first object, or control display of the image to be changed based on the operation made by the first object and the second object.

7. The image processing apparatus according to claim 3, wherein the circuitry is further configured to obtain model information of the display, and set the first threshold and the second threshold based on the obtained model information.

8. The image processing apparatus according to claim 7, wherein the circuitry is further configured to set the first area and the second area based on the obtained model information.

9. The image processing apparatus according to claim 7, wherein the obtained model information indicates a resolution of the display.

10. The image processing apparatus according to claim 1, wherein when a contact portion of the second object is detected by the detector while the circuitry controls display of the displayed image to be erased from the contact portion of the first object, the circuitry is further configured to control display of the image to be displayed at the contact portion of the second object or erased from the contact portion of the second object, based on distance between the contact portion of the first object and the contact portion of the second object.

11. A method of processing an image, the method comprising:

obtaining size data of a contact portion of a first object on a display;

measuring a time passed since a touch of the first object is detected by a detector;

controlling display of an image to be displayed at the contact portion or a displayed imaged to be erased from the contact portion, based on the obtained size data and based on whether a second object is detected before a prescribed time has elapsed since the measuring started, controlling display of an image to be changed based on an operation made by the first object and the second object, when the obtained size data is less than a first threshold and the second object is detected before the prescribed time has elapsed since the measuring started, controlling display of the image to be changed based on an operation made by the first object and the second object, and when the obtained size data is less than a first threshold and the second object is not detected before the prescribed time has elapsed since the measuring started, controlling display of the image to be displayed at the contact portion of the first object.

12. A non-transitory computer-readable recording medium storing a program for causing a computer to execute a method, the method comprising:

obtaining size data of a contact portion of a first object on a display;

measuring a time passed since a touch of the first object is detected by a detector;

controlling display of an image to be displayed at the contact portion or a displayed image to be erased from the contact portion based on the obtained size data and based on whether a second object is detected before a prescribed time has elapsed since the measuring started, controlling display of an image to be changed based on an operation made by the first object and the second object, when the obtained size data is less than a first threshold and the second object is detected before the prescribed time has elapsed since the measuring started, controlling display of the image to be changed based on an operation made by the first object and the second object, and when the obtained size data is less than a first threshold and the second object is not detected before the prescribed time has elapsed since the measuring started, controlling display of the image to be displayed at the contact portion of the first object.

* * * * *